Figure 5:
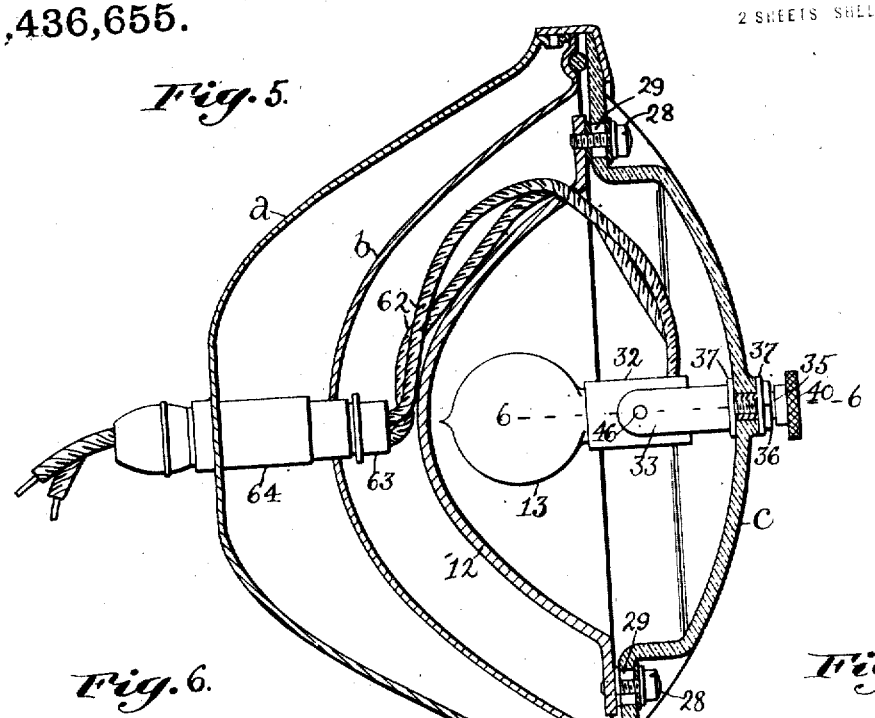

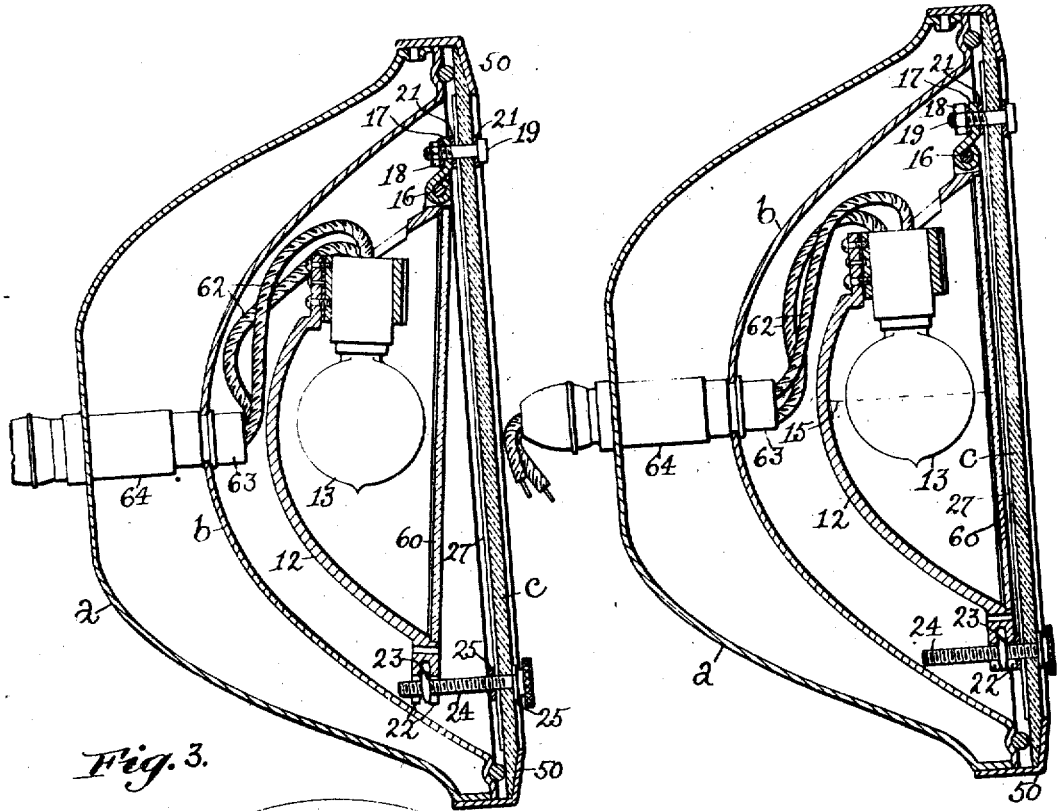

C. A. B. HALVORSON, Jr.
ILLUMINATING DEVICE.
APPLICATION FILED MAY 1, 1918.

1,436,655.

Patented Nov. 28, 1922.

Inventor
Cromwell A. B. Halvorson Jr.
by Jas. H. Churchill
Atty.

Patented Nov. 28, 1922.

1,436,655

UNITED STATES PATENT OFFICE.

CROMWELL A. B. HALVORSON, JR., OF SAUGUS, MASSACHUSETTS, ASSIGNOR OF ONE-HALF TO CHILDE HAROLD WILLS, OF DETROIT, MICHIGAN.

ILLUMINATING DEVICE.

Application filed May 1, 1918. Serial No. 231,935.

*To all whom it may concern:*

Be it known that I, CROMWELL A. B. HALVORSON, Jr., a citizen of the United States, and a resident of Saugus, in the county of Essex and State of Massachusetts, have invented an Improvement in Illuminating Devices, of which the following description, in connection with the accompanying drawings, is a specification, like characters on the drawings representing like parts.

This invention relates to an illuminating device and is herein shown as embodied in a headlight for vehicles and particularly motor vehicles and the like.

The invention has for its object to provide an illuminating device with which a maximum lighting effect without glare for a maximum distance in front of the illuminating device, together with a diffusion or lighting effect laterally with relation to the illuminating device may be obtained.

Illuminating devices having these characteristics are especially serviceable as the headlights of an automobile, inasmuch as they serve to illuminate the roadway for the desired or required distance in front of the headlight and also illuminate laterally the roadway and the territory adjacent thereto, and accomplish these desirable ends without glare and consequently without danger to the occupants of a vehicle approaching from the opposite direction, or to other users of the roadway.

To this end the illuminating device is provided with an electric lamp or other source of light, a reflector co-operating with said lamp and preferably one which is capable of giving a beam of light having rays in substantially parallel planes which are substantially parallel with the axis of the reflector, and a member composed in whole or in part of glass having prismatic surfaces, such as ribs, lenses, prisms or like devices for re-directing the rays of light preferably in a lateral direction, either the said lamp or reflector or member being movable to divert the beam of light projected through the glass and obtain without glare the distant lighting desired or required.

The invention further has for its object to provide a unit composed of a reflector, glass, and source of light which are connected together to constitute one of them a support for the others so as to be capable of being handled as one piece and having one of said elements movable to divert the beam of light projected through said glass.

The invention also has for its object to provide a unit of the character referred to, which is capable of being substituted in headlights now in use for the glass thereof.

The invention further has for its object to provide for adjustment of the movable element of the unit from in front of the latter.

These and other features of this invention will be pointed out in the claims at the end of this specification.

Fig. 1 is a vertical sectional view of one form of headlight embodying this invention.

Fig. 2, a like view with the reflector adjusted to project the beam of light downward.

Fig. 3, a front elevation of the headlight shown in Fig. 1.

Fig. 4, a horizontal section on an enlarged scale of a portion of the glass to illustrate one form of re-directing devices.

Fig. 5, a modified form of headlight embodying the invention to be referred to.

Figure 6:
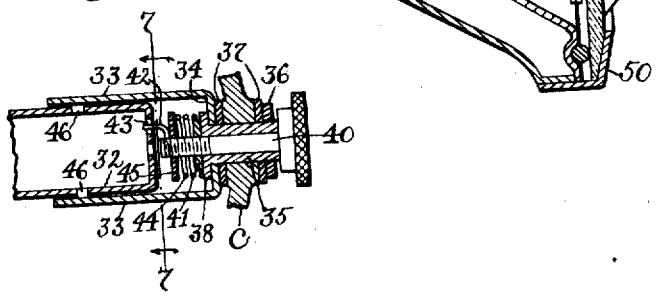
Figure 7:
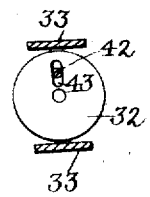

Fig. 6, an enlarged detail of a portion of the headlight shown in Fig. 5, the section being taken on the line 6—6, Fig. 5, and Fig. 7, a section on the line 7—7, Fig. 6.

The ordinary headlight commonly used on automobiles comprises a metal casing open at its front end, a glass to normally close the same, a reflector and a lamp located in said casing, and in the present instance I have illustrated the invention as embodied in such a headlight, wherein $a$ represents the metal casing and $b$ the reflector located therein.

For the ordinary glass, I have in the present instance substituted a member $c$ which is composed in whole or in part of glass, and which has associated with it so as to form a unit, a reflector 12 and an electric lamp 13 of standard type.

In Figs. 1 and 2, the lamp 13 is represented as carried by the reflector 12 and may be adjustably mounted thereon so as to properly position it with relation to the axis of the reflector represented by the line 15, and the reflector is attached to the member $c$ so as to be movable with relation thereto.

In Figs. 1 and 2, the reflector 12 is shown as pivoted at its top portion as at 16 to a bearing member 17, preferably of metal, which is secured in fixed relation to the glass c, and in the present instance the bearing member 17 is secured by a nut 18 engaging a bolt 19 which is extended through a hole in the glass, suitable washers 21 being interposed between the glass and the bearing member 17 and the head of the bolt 19.

Provision is made for moving the reflector on its pivot, and in the present instance, the reflector is shown as provided at its lower portion with lugs 22 spaced apart and between which is located a nut 23 which engages a threaded bolt 24, which is extended through a suitable hole in the glass c, suitable washers 25 being interposed between the glass and the lugs 22 and head of the bolt 24.

The bolt 24 is made of suitable length to permit the lower portion of the reflector to be moved away from the glass after the manner represented in Fig. 2, and thus incline the reflector with relation to the glass so as to incline the axis of the reflector 12 downward for a purpose to be described.

The lugs 22 are suitably constructed to straddle the bolt 24 and permit movement of the reflector with relation to the glass.

The reflector 12 is of a shape suitable to give a beam of light having rays in substantially parallel planes, which are substantially parallel with the axis of the reflector, such as the parabolic reflector.

As represented in Fig 1, the reflector 12 is shown with its axis substantially at right angles to the plane of the glass c, and the relation of the reflector to the glass is substantially the same as in the ordinary or well-known headlight, which arrangement gives a maximum distant lighting accompanied by a glare which is highly objectionable in the case of the headlights now commonly used on automobiles.

To avoid the glare referred to, the operator turns the bolt or screw 24 so as to move the lower portion of the reflector away from the glass and thereby incline downward the axis of the reflector, with the result that the beam of light is caused to strike the roadway nearer the headlight, and those diverging rays of light which produced the glare are brought down near the roadway and into a position substantially parallel with the latter, and further are brought below the desired or required point or plane above the roadway or ground at a given distance in front of the vehicle, and in this manner the requirements of the authorities may be complied with so far as the anti-glare feature is concerned.

It is also highly desirable to provide for a lateral diffusion of the rays of light so as to illuminate not only the roadway for its entire width but also the gutters, ditches and sidewalks, whereby the danger of accidents commonly occurring at night may be avoided.

This result is accomplished by providing the glass c with suitable prismatic devices or surfaces, and in the present instance, the prismatic surfaces are shown as substantially vertically arranged ribs, lenses or prisms 27, which re-direct the rays of light and spread or diffuse the light, preferably in a lateral direction, for a substantial distance and over a substantial area, and this diffused light also has the effect of killing or diminishing the glare from the headlight of an approaching vehicle equipped with a headlight giving a glaring light.

In Figs. 1 and 2, the adjustment of the beam of light in a vertical plane is effected by moving the reflector into a position at an angle to the glass, but it is not desired to limit the invention in this respect, as a similar result may be obtained by moving either one of the other two elements of the unit, and in Fig. 5 the lamp and the reflector are both shown as independently movable with respect to the glass.

In the arrangement represented in Fig. 5, the reflector 12 is shown as fastened at its top and bottom to the glass by the screws 28 which extend through slots 29 in the glass, and the lamp 13 is supported or carried by the glass and is adjustable from in front thereof, the socket member 32 of the lamp being pivotally mounted to turn in a vertical plane in the arms 33 of a yoke-shaped frame, whose cross bar 34 is clamped to the glass by a bushing 35 and nut 36, suitable washers 37 being interposed between the glass and the cross bar 34 and the nut 36.

The bushing 35 has extended through it a thumb-screw 40 having a nut 41 engaged therewith, by which the bushing 35 is secured to the glass. The screw 40 is provided at its inner end with a hole through which one arm of a bent rod 42 is inserted, whose other arm is extended into an elongated slot 43 in the bottom or end wall of the socket member 32.

The rod 42 is retained in place by a spring 44 interposed between a washer 45 and the inner end of the bushing. The bent rod 42 constitutes one form of crank on the thumb-screw 40, so that when the latter is turned in the bushing 35 from in front of the glass, the crank turns the socket piece or member 32 on its pivots 46 and tilts the lamp from a horizontal into an inclined position in a vertical plane, with the result that the greater portion of the parallel rays of the beam of light are inclined downward toward the roadway and the greater portion of the normally divergent rays are lowered into a substantially horizontal position substantially parallel with the roadway to remove the glare from the headlight in a similar manner to that above described with relation to Figs. 1 and 2.

In the arrangement shown in Fig. 5, as well as that shown in Figs. 1 and 2, it will be observed that the glass, reflector and lamp are connected together to constitute one of them a support for the others so as to form a unit which is capable of being handled as one piece, and which can be substituted for the glass of the ordinary headlight, for it is only necessary to remove from the casing *a* the retaining ring 50 and the glass of the ordinary headlight, substitute in the ring 50 for the ordinary glass the unit herein shown, and replace the ring on the casing.

It will be understood also that the electric lamp may be of any suitable construction such as now commonly used and have the usual provision for initial focal adjustment with relation to the reflector.

While it may be preferred to provide the unit above referred to with a glass having substantially vertically arranged prisms or other devices to redirect the rays of light preferably in a lateral direction to obtain lateral diffusion of light, it is not desired to limit the invention in this respect, as a glass without the said prisms or devices may be used in the unit and the advantages of the no-glare effect obtained.

Furthermore the reflector 12 may be provided with a glass 60 having the re-directing devices 27 as indicated in Figs. 1 and 2, which glass may be used in conjunction with the glass *c* provided with re-directing devices to amplify the lateral diffusion, or the glass 60 in the reflector 12 may be alone relied upon to obtain the lateral diffusion of light, in which case the glass *c* may be a plain glass like that now commonly used in headlights.

In the arrangement shown in Fig. 5, the reflector 12 is shown as capable of being moved with relation to the glass *c*, which is permitted by the elongated slots 29 through which the screws 28 are extended, and by making the reflector 12 movable as described, the beam of light may be adjusted to obtain the no-glare effect by moving the reflector 12 alone or the lamp 13 alone or by adjusting both.

The clamp 13 forming part of the unit herein shown is connected by the usual wires 62 with a plug switch 63, which is capable of being inserted in the usual socket piece 64 now commonly attached to the casing *a* of the ordinary headlight.

In the units herein shown the lamp or reflector or both are shown as movable with relation to the glass *c* but it is not desired to limit the invention in this respect.

In the present instance I have illustrated one form of re-directing devices for obtaining the lateral diffusion, to wit:—ribs or prisms, which extend substantially the full diameter of the glass, but it is not desired to limit the invention to the particular form or length of the devices herein shown.

In the form of headlight herein shown, it will be observed that its casing is open at one end and is closed by a unit comprising a member composed in whole or in part of glass, a reflector and a source of light connected together and one of which elements is adjustable or movable so as to divert the beam of light projected through the glass and thereby eliminate the glare of the light employed for distant lighting.

I have herein shown the unit comprising the glass, reflector and lamp connected together, and one of which is movable with relation to another or to a supporting member, as forming part of a headlight, but it is not desired to limit the invention in this respect.

Claims.

1. A light-transmitting device adapted to be attached to a headlight and forming a closure member, comprising a reflector, a light source, and a light-transmitting member, and means for moving one of said elements with relation to another of said elements for deflecting the projected rays downwardly to obviate glare.

2. A light-transmitting device comprising a supporting member, a reflector, a light source, and a light-transmitting member, said reflector being carried by the light-transmitting member to form a unit capable of being used as a closure member for the casing of an ordinary headlight, and means on the light-transmitting member to deflect projected rays downward.

3. A light-transmitting device capable of forming a closure member for the ordinary headlight, comprising a reflector, a light source, and a light-transmitting member, said last-mentioned member forming a support for the reflector and light source, and means co-operating with said support to cause the deflection of the projected beam when desired.

4. A light-transmitting device adapted to be attached to a headlight and forming a closure member, comprising a reflector, a light source, a light-transmitting member, and means for deflecting the projected beam of light and for moving it into different positions in the same plane to obviate glare.

5. A light-transmitting device adapted to be attached to a headlight, comprising a closure-member capable of transmitting light, a reflector carried by said closure member and movable with relation thereto, and means extended through said closure member for moving said reflector for tilting a beam of light projected through said closure member with relation to an axis through the center of the latter to obviate glare.

6. A light-transmitting device adapted to be attached to a headlight, comprising a closure member capable of transmitting light, and a light projecting device carried by said closure member to be moved therewith as a unit and means to move said device with relation thereto to effect deflection of the beam of light to obviate glare.

7. The combination with a headlight casing, of a closure member therefor capable of transmitting light, and a light projecting device carried by said closure member to be moved therewith as a unit and means to move said device with relation to said closure member to tilt a beam of light projected through the latter to obviate glare.

8. A light-transmitting device adapted to be substituted for the glass of an ordinary headlight to form a closure member for the latter, and comprising a reflector, a light source, a light transmitting member, and means for effecting a change in the relation of said reflector, light source and light-transmitting member to deflect the projected beam of light to obviate glare.

9. A light-transmitting device adapted to be attached to a headlight, comprising a closure member capable of transmitting light, light-projecting means carried by said closure member, a device for deflecting a beam of light projected through said closure member to obviate glare, and means for securing said device to said closure member to move therewith as a unit and to be moved with relation thereto to effect the deflection of said beam of light.

10. A light-transmitting device adapted to be attached to a headlight, comprising a closure member capable of transmitting light, a light-projecting device carried by said closure member to be moved therewith as a unit, and means to move said device with relation thereto to effect deflection of the beam of light to obviate glare.

11. A light transmitting device adapted to be substituted for the glass of an ordinary headlight to form a closure member for the latter, and comprising a reflector, a light source, means for effecting deflection of the beam of light projected by said reflector to obviate glare, and a light transmitting member to which said reflector, light source and said means are attached to be moved therewith as a unit with relation to said headlight.

In testimony whereof, I have signed my name to this specification.

CROMWELL A. B. HALVORSON, Jr.